United States Patent
Sandhu et al.

(10) Patent No.: US 10,650,191 B1
(45) Date of Patent: May 12, 2020

(54) DOCUMENT TERM EXTRACTION BASED ON MULTIPLE METRICS

(71) Applicant: Elementary IP LLC, Santa Clara, CA (US)

(72) Inventors: Sumeet Sandhu, Santa Clara, CA (US); Tami Lee, Saratoga, CA (US)

(73) Assignee: Elementary IP LLC, Santa Clara, CA (US)

( * ) Notice: Subject to any disclaimer, the term of this patent is extended or adjusted under 35 U.S.C. 154(b) by 69 days.

(21) Appl. No.: 16/009,138

(22) Filed: Jun. 14, 2018

(51) Int. Cl.
| | | |
|---|---|---|
| *G06F 16/00* | (2019.01) | |
| *G06F 40/279* | (2020.01) | |
| *G06F 16/35* | (2019.01) | |
| *G06F 16/31* | (2019.01) | |
| *G06F 16/338* | (2019.01) | |
| *G06F 40/242* | (2020.01) | |
| *G06F 16/335* | (2019.01) | |

(52) U.S. Cl.
CPC .......... *G06F 40/279* (2020.01); *G06F 16/313* (2019.01); *G06F 16/338* (2019.01); *G06F 16/35* (2019.01); *G06F 40/242* (2020.01); *G06F 16/335* (2019.01)

(58) Field of Classification Search
CPC .......................... G06F 16/2453; G06F 16/2454
USPC ........................................................ 707/713
See application file for complete search history.

(56) References Cited

U.S. PATENT DOCUMENTS

| | | | |
|---|---|---|---|
| 6,654,742 | B1 | 11/2003 | Kobayashi et al. |
| 6,741,981 | B2 | 5/2004 | McGreevy |
| 7,779,019 | B2 | 8/2010 | Burges |
| 8,812,493 | B2 | 8/2014 | Tankovich et al. |
| 9,037,464 | B1 | 5/2015 | Mikolov et al. |
| 9,449,080 | B1* | 9/2016 | Zhang ..................... G06F 17/27 |
| 9,672,814 | B2 | 6/2017 | Cao et al. |
| 10,387,469 | B1* | 8/2019 | Zhang ..................... G06F 16/35 |
| 2007/0162481 | A1 | 7/2007 | Millett |
| 2011/0225155 | A1* | 9/2011 | Roulland .............. G06F 16/285 707/737 |
| 2013/0066845 | A1* | 3/2013 | Hagar ................. G06F 16/3329 707/706 |
| 2014/0223296 | A1 | 8/2014 | Solmer et al. |
| 2014/0324808 | A1 | 10/2014 | Sandhu et al. |

(Continued)

OTHER PUBLICATIONS

Ayasdi, "TDA and Machine Learning: Better Together," available at https://s3.amazonaws.com/cdn.ayasdi.com/wp-content/uploads/2017/08/28134706/WP-TDAandML-BetterTogether-07172017.pdf (Nov. 28, 2017).

(Continued)

*Primary Examiner* — Daniel Abebe

(74) *Attorney, Agent, or Firm* — Huse IP Law; Charles C. Huse

(57) ABSTRACT

A method of analyzing text is performed at an electronic system that includes one or more processors and memory storing instructions for execution by the one or more processors. The method includes extracting terms from a corpus of text and generating a plurality of rankings of the extracted terms. Each ranking of the plurality of rankings is based on a respective metric of a plurality of metrics. The method further includes defining a set of terms, which includes selecting a number of top-ranked terms from each ranking of the plurality of rankings. The set of terms may be provided for display and/or used as search terms to perform a search.

20 Claims, 14 Drawing Sheets

(56) References Cited

U.S. PATENT DOCUMENTS

| | | |
|---|---|---|
| 2016/0328386 A1 | 11/2016 | Cross et al. |
| 2017/0004208 A1 | 1/2017 | Podder et al. |
| 2017/0124447 A1 | 5/2017 | Chang et al. |
| 2018/0137137 A1 | 5/2018 | Jin et al. |

OTHER PUBLICATIONS

Gidi Shperber, "A Gentle Introduction to Doc2Vec," Medium, Jul. 25, 2017.

Paramveer S. Dhillon et al., "Eigenwords: Spectral Word Embeddings," Journal of Machine Learning Research 16 (2015), pp. 3035-3078.

Sumeet Sandhu et al., "Examples of Similar Terms," Patent Information Users Group 2017 Annual Conference, May 23, 2017.

Sumeet Sandhu et al., "Modern Patent Analytics via Deep Learning AI," Patent Information Users Group 2017 Annual Conference, May 23, 2017.

Sumeet Sandhu, "Deep Learning AI for Patent Search and Analytics," LinkedIn, May 28, 2017.

Summet Sandhu et al., "Case Studies in Deep Learning Patent Analytics," Patent Information Users Group 2018 Annual Conference, May 9, 2018.

Tensorflow, "Vector Representations of Words," available at https://www.tensorflow.org/tutorials/word2vec (last updated May 25, 2018).

\* cited by examiner

200

Generate a model of a corpus of text. The model includes respective numerical representations corresponding to respective portions of the corpus. Proximities between respective pairs of numerical representations represent degrees of similarity between respective portions of the corpus. (202)

↓

Select a first portion of the corpus. The first portion corresponds to a first numerical representation in the model. (204)

↓

Define a first set of portions of the corpus including a specified number of nearest-neighbor portions to the first portion. The first set of portions corresponds to a first set of nearest-neighbor numerical representations to the first numerical representation in the model. (206)

↓

Define a second set of portions including specified numbers of nearest-neighbor portions to each portion of the first set of portions. The second set of portions corresponds to a second set of nearest-neighbor numerical representations to respective numerical representations of the first set of nearest-neighbor numerical representations in the model. (208)

↓

Define a third set of portions including the first set of portions and the second set of portions. (210)

↓

Cluster the third set of portions into a plurality of clusters of portions, to produce a relationship between the first portion and the third set of portions. (212)

↓

Provide, for display, a relationship graph illustrating the relationship between the first portion and the third set of portions. (214)

> Provide the relationship graph for display in a GUI that allows a user to edit the relationship. (216)

DOCUMENT TERM EXTRACTION BASED ON MULTIPLE METRICS

TECHNICAL FIELD

This disclosure relates to identifying terms in a corpus of text using multiple rankings based on respective metrics.

BACKGROUND

Despite the advances in search technology, searching remains an often-onerous task. For example, searches tend to be iterative, because initial rounds of searching are performed to identify search terms that may be used in subsequent rounds of searching. Searchers do not initially know if there are helpful search terms they do not know. The effectiveness of a search may be limited by the existence of variants of a term. Evaluating search results is onerous, often requiring review of entire documents.

An example of a difficult type of searching is patent searching. A searcher may not know the best technical terms to use in a patent search. Different patents or patent applications may use different terms, or variants of the same term, to refer to the same or similar ideas or entities. To evaluate the relevance of the results of a patent search, the searcher often has to manually review dense sections of the patent or patent application, such as the claims and detailed description.

SUMMARY

Accordingly, there is a need for systems and methods to extract terms from text, such as sections of a text that represent the essence of the text and may be used as a summary to evaluate the text for relevance.

In some embodiments, a method of analyzing text is performed at an electronic system that includes one or more processors and memory storing instructions for execution by the one or more processors. The method includes extracting terms from a corpus of text and generating a plurality of rankings of the extracted terms. Each ranking of the plurality of rankings is based on a respective metric of a plurality of metrics. The method further includes defining a set of terms, which includes selecting a number of top-ranked terms from each ranking of the plurality of rankings. The set of terms may be provided for display and/or used as search terms to perform a search.

In some embodiments, an electronic system includes one or more processors and memory storing one or more programs for execution by the one or more processors. The one or more programs include instructions for performing the above method. In some embodiments, a non-transitory computer-readable storage medium stores one or more programs configured for execution by an electronic system. The one or more programs include instructions for performing the above method.

Such methods and systems increase the speed, efficiency, and effectiveness of searching, for example by identifying useful search terms, identifying representative terms in a document, and/or finding variants of a given term.

BRIEF DESCRIPTION OF THE DRAWINGS

For a better understanding of the various described implementations, reference should be made to the Detailed Description below, in conjunction with the following drawings.

FIGS. 2A-2C are flowcharts showing a method of analyzing text in accordance with some embodiments.

Like reference numerals refer to corresponding parts throughout the drawings and specification.

DETAILED DESCRIPTION

Reference will now be made in detail to various embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
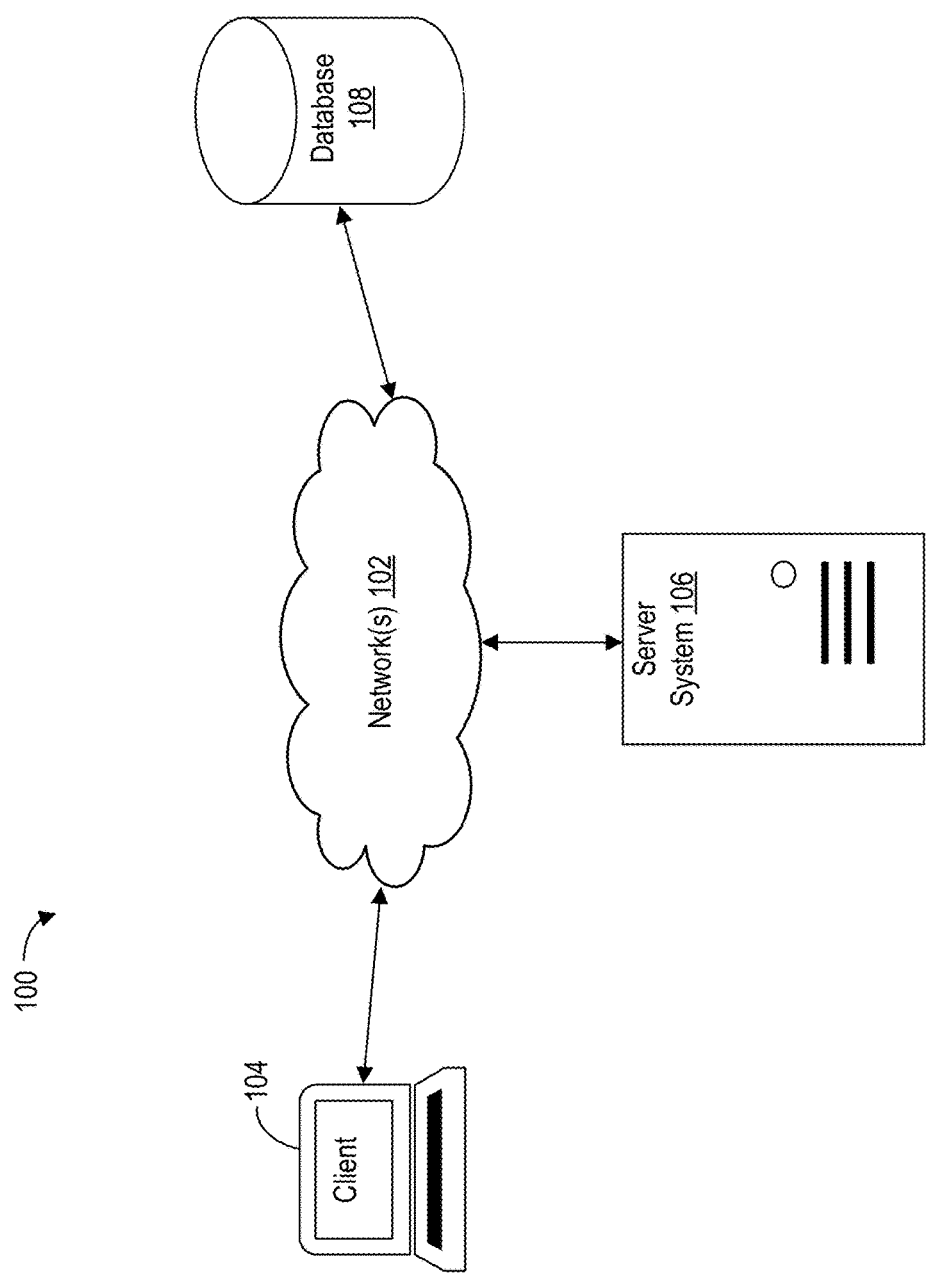
FIG. 1 is a block diagram illustrating a network architecture in accordance with some embodiments.

FIG. 1 is a block diagram illustrating a network architecture 100 in accordance with some embodiments. In the network architecture 100, one or more client devices 104 (a single client device 104 is shown for simplicity) are communicatively coupled to a server system 106 through one or more networks 102. The one or more networks 102 also provide the server system 106 and/or client devices 104 with access to a database 108. (Alternatively, the database is part of or is situated with the server system 106). The database 108 stores a corpus of text (e.g., a document or set of documents). The database 108 may also store additional information. For example, the database 108 may store one or more documents in addition to the corpus of text, and may store images, audio, and/or video associated with respective portions of the corpus of text (e.g., such that respective portions of the corpus of text describe respective image, audio, and/or video files or portions thereof). In some embodiments, the database 108 includes patents and/or patent applications (e.g., the database 108 is Google Patents, the European Patent Office's Espacenet database, the United States Patent and Trademark Office's PatFT and/or AppFT databases, etc.). Many other examples of the database 108 are possible. The server system 106 may access the database 108, analyze information in the database 108 (e.g., in response to a request from a client 104), and provide (i.e., transmit) results of the analysis to the client device 104. For example, the server system 106 may analyze text and compute corresponding algorithms (e.g., may perform the methods 200, 220, 240, 260, and/or 400, FIGS. 2A-2D and 4). Alternatively, a client device 104 may access the database

108, analyze information in the database 108, and display results of the analysis. The server system 106 thus may be omitted from the network architecture 100 in accordance with some embodiments.

Examples of the one or more networks 102 include public communication networks, private communication networks, or a combination of both public and private communication networks. For example, the one or more networks 102 can include any network (or combination of networks) such as the Internet, other wide area networks (WAN), local area networks (LAN), virtual private networks (VPN), metropolitan area networks (MAN), peer-to-peer networks, and/or ad-hoc connections.

Examples of the client device 104 include a mobile electronic device (e.g., mobile phone), laptop computer, tablet computer, desktop computer, or any other suitable electronic device. The server system 106 and database 108 may be implemented as respective systems (e.g., in different locations, such as different data centers; in the same or different virtual locations via virtualization) or alternatively may be combined into a single system. For example, the server system 106 may act as a front end for the database 108. The server system 106 may be a single server computer or multiple server computers. For example, the server system 106 may be implemented by multiple computing devices (e.g., in the same data center or distributed across multiple data centers) working together to perform the actions of a server system (e.g., using cloud computing). Similarly, the database 108 may be stored on a single storage device or on multiple storage devices (e.g., in the same data center or distributed across multiple data centers).

FIG. 2A is a flowchart showing a method 200 of analyzing text in accordance with some embodiments. The method 200 may be performed by the server system 106 (FIG. 1). Alternatively, the method 200 may be performed by a client device 104 (FIG. 1), or performance of the method 200 may be divided between the server system 106 and client device 104. The method 200 thus may be performed by one or more electronic systems 800 (FIG. 8), each of which may be an example of a server system 106 or client device 104. Steps in the method 200 may be combined or broken out.

In the method 200, a model of a corpus of text (e.g., the corpus of text stored in the database 108, FIG. 1) is generated (202). The model includes respective numerical representations corresponding to respective portions of the corpus. Proximities between respective pairs of numerical representations represent degrees of similarity (e.g., contextual, semantic, syntactic, and/or lexical similarity) between respective portions of the corpus. Proximities may be measured using the cosine distance, vector dot product, or other suitable distance metric. Thus, the greater the distance between respective pairs of numerical representations in the model, the less similar the respective portions are considered to be.

In some embodiments, the corpus of text includes (e.g., is limited to) a document or set of documents and the portions of the corpus include (e.g., are limited to) words in the document or set of documents. The respective numerical representations of the model include numerical representations corresponding to respective words. For example, the numerical representations may be word vectors (e.g., generated using word2vec). The proximities between respective pairs of numerical representations in the model (e.g., between word vectors in a vector space) represent degrees of similarity between respective words: the closer the numerical representations, the more similar the corresponding pair of words.

Generating the model may include assigning tags to respective words in the document that specifying semantic, syntactic, and/or lexical properties for the words. For example, tags (e.g., parts-of-speech (POS) tags) may specify parts of speech for respective words (e.g., nouns, verbs, adjectives, etc.). Tags (e.g., dependency parsed tags) may specify relationships between words (e.g., subject, object, etc.). The model may include different numerical representations for identical words having distinct tags. Occurrences of the same word with different tags are thus effectively treated as different words in the model, in accordance with some embodiments. Tags may be assigned to respective words before the numerical representations corresponding to the respective words are generated. In some embodiments, after the numerical representations corresponding to the respective words have been generated, a neural network is used to revise the tags assigned to the respective words, to produce the final tags for the model. The final tags may be different types of tags from the initially-assigned tags.

In some embodiments, the corpus of text includes (e.g., is limited to) a document and the portions of the corpus include (e.g., are limited to) terms in the document. The terms may be noun phrases that include nouns and their modifiers and/or verb phrases that includes verbs and their modifiers. For example, the corpus of text includes a patent or patent application and respective portions are respective terms (e.g., phrases) within the patent or patent application. The proximities between respective pairs of numerical representations (e.g., between vectors for terms in a vector space) in the model represent degrees of similarity between respective terms: the closer the numerical representations, the more similar the corresponding pair of terms.

In some embodiments, the corpus of text includes a plurality of documents and the portions of the corpus include (e.g., are limited to) respective documents. For example, the plurality of documents includes (e.g., is limited to) a plurality of patents and/or patent applications (e.g., a plurality of patent applications sharing one or more classes in a classification scheme). The respective numerical representations of the model include numerical representations corresponding to respective documents. For example, the numerical representations may be document vectors (e.g., generated using doc2vec). The proximities between respective pairs of numerical representations in the model (e.g., between document vectors in a vector space) represent degrees of similarity between respective documents: the closer the numerical representations, the more similar the corresponding pair of documents.

A first portion of the corpus is selected (204). The first portion corresponds to a first numerical representation in the model. The first portion may be selected based on user input at the client device 104 (e.g., which may be communicated to the server system 106): the user may specify (e.g., enter, highlight, click on, etc.) the first portion.

A first set of portions of the corpus is defined (206). The first set of portions includes a specified number of nearest-neighbor portions to the first portion (e.g., the top n nearest neighbors of the first portion as determined using the model, where n is an integer greater than one). The first set of portions corresponds to a first set of nearest-neighbor numerical representations to the first numerical representation in the model.

A second set of portions is defined (208). The second set of portions includes specified numbers of nearest-neighbor portions to each portion (or respective portions) of the first set of portions (e.g., the top m nearest neighbors of each portion in the first set of portions as determined using the model, where m is an integer greater than one). The second set of portions thus includes second-degree nearest neighbors of the first portion, whereas the first set of portions includes first-degree nearest neighbors of the first portion. The second set of portions corresponds to a second set of nearest-neighbor numerical representations to respective numerical representations of the first set of nearest-neighbor numerical representations in the model.

In some embodiments, the specified number of nearest-neighbor portions to the first portion is a first number and the specified numbers of nearest-neighbor portions to each portion of the first set of portions all equal a second number distinct from (or alternatively, equal to) the first number. The first and second numbers may, for example, each be in the range of 8-15. In other embodiments, respective specified numbers of nearest-neighbor portions to respective portions of the first set of portions are distinct (e.g., and are also distinct from the first number).

A third set of portions is defined (210) that includes the first set of portions and the second set of portions. The third set of portions thus includes first-degree and second-degree nearest neighbors of the first portion, as determined using the model.

In some embodiments, the third set of portions includes one or more additional degrees of nearest neighbors to the first portion. For example, a fourth set of portions is defined that includes specified numbers of nearest-neighbor portions to each portion of the second set of portions. The fourth set of portions corresponds to a set of nearest-neighbor numerical representations to respective numerical representations of the second set of nearest-neighbor numerical representations in the model. The third set of portions includes the fourth set of portions as well as the first and second sets of portions, and thus includes third-degree nearest neighbors of the first portion as well as first-degree and second-degree nearest neighbors.

In some embodiments, nearest-neighbor portions are filtered or modified (e.g., by removing stop-words or punctuation like "a", "the", "such", ".", etc.) before being included in a set of portions (e.g., the first, second, third, or fourth set of portions).

The third set of portions is clustered (212) into a plurality of clusters of portions, to produce a relationship between the first portion and the third set of portions. Examples of clustering algorithms that may be used include, but are not limited to, K-means and Affinity Propagation.

If tags were assigned to words to specify semantic, syntactic, and/or lexical properties for the words, then respective words in the third set of portions have respective tags. The third set of portions may have multiple occurrences of a word, each with a distinct tag.

In some embodiments, a relationship graph illustrating the relationship between the first portion and the third set of portions is provided (214) for display (e.g., a rendering of the relationship graph is transmitted from the server system 106 to the client device 104 for display). For example, N-dimensional numerical representations of portions (e.g., vectors) are mapped to two-dimensional (2D) or three-dimensional (3D) representations (e.g., using t-distributed Stochastic Neighbor Embedding or multidimensional scaling) to create the relationship graph. The method 200 thereby provides an effective way for a user to explore the content of an electronic corpus of text.

Figure 3A:
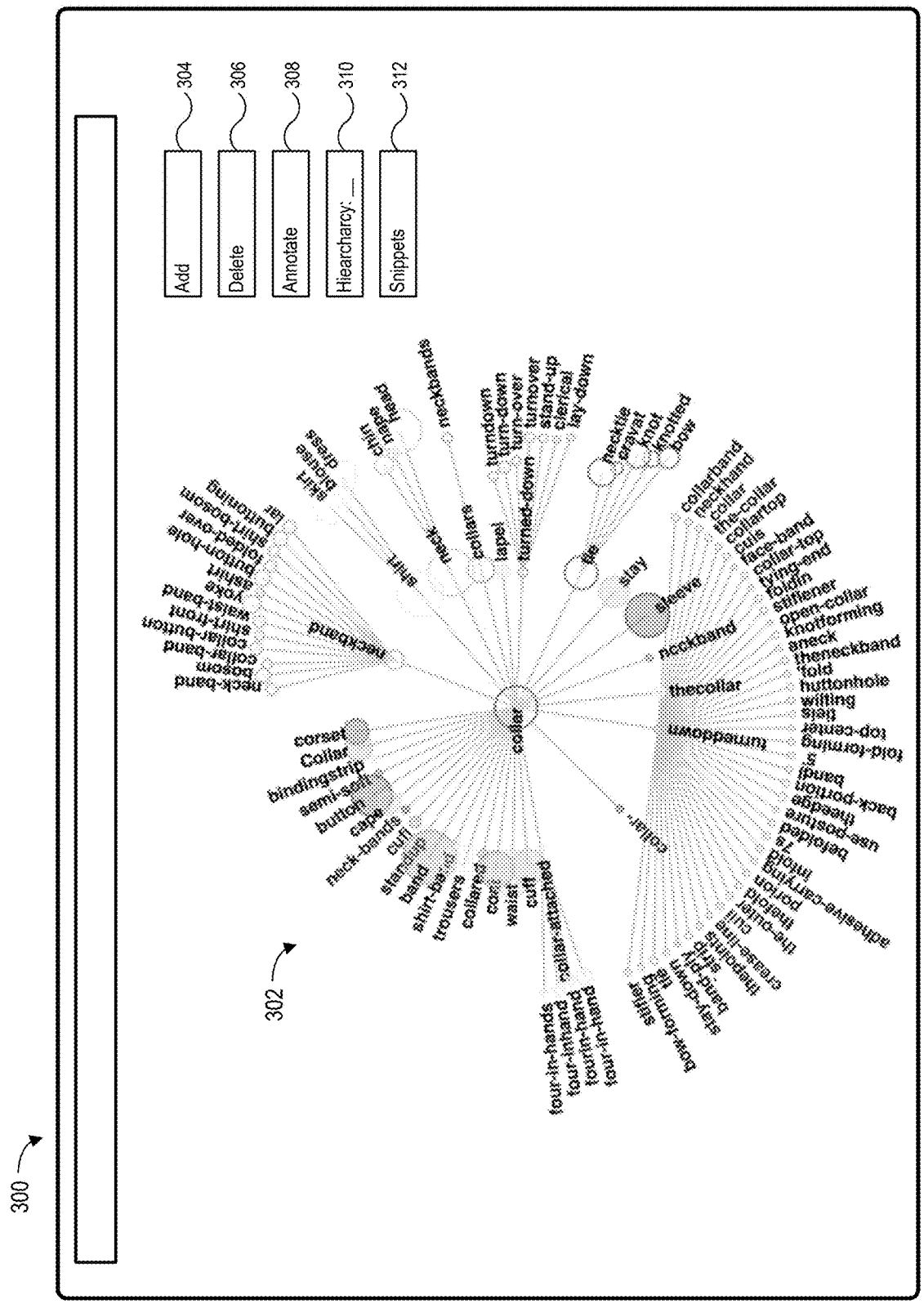
FIGS. 3A-3E show a graphical user interface for viewing and editing the results of automated textual analysis in accordance with some embodiments.

FIG. 3A shows an example of a relationship graph 302 for a corpus involving clothing. The first portion is the word "collar." The other words shown in the relationship graph 302 are from the third set of portions. Words shown as being directly connected to "collar" and also having other words directly connected to them correspond to clusters (e.g., are the centroids of clusters). For example, the word "tie" is in a cluster that also includes "necktie," "cravat," "knot," "knotted," and "bow." Words shown as being directly connected to "collar" are not necessarily from the first set of portions (i.e., are not necessarily nearest neighbors of "collar"); they could be from the second set of portions (i.e., second-degree neighbors of "collar"). Some portions (e.g., the words "coat," "waist," "cuff," etc.) of the relationship graph 302 are not part of clusters (or equivalently, are in clusters of size one). In some embodiments, the proximity between the first portion and another portion in the relationship graph corresponds to a degree of similarity as indicated by the model. In some embodiments, the size of the circle next to each portion shown in the relationship graph indicates the number of occurrences of the portion in the corpus (e.g., "knot" has a higher frequency than "bow," which has a higher frequency than "knotted").

The relationship graph may be provided (216) for display in a graphical user interface (e.g., GUI 300, FIG. 3A) that allows a user (e.g., a user of the client device 104, FIG. 1) to edit the relationship. The GUI may be displayed on the screen of the client device 104. Examples of such editing are described in FIG. 2B.

Figure 2B:
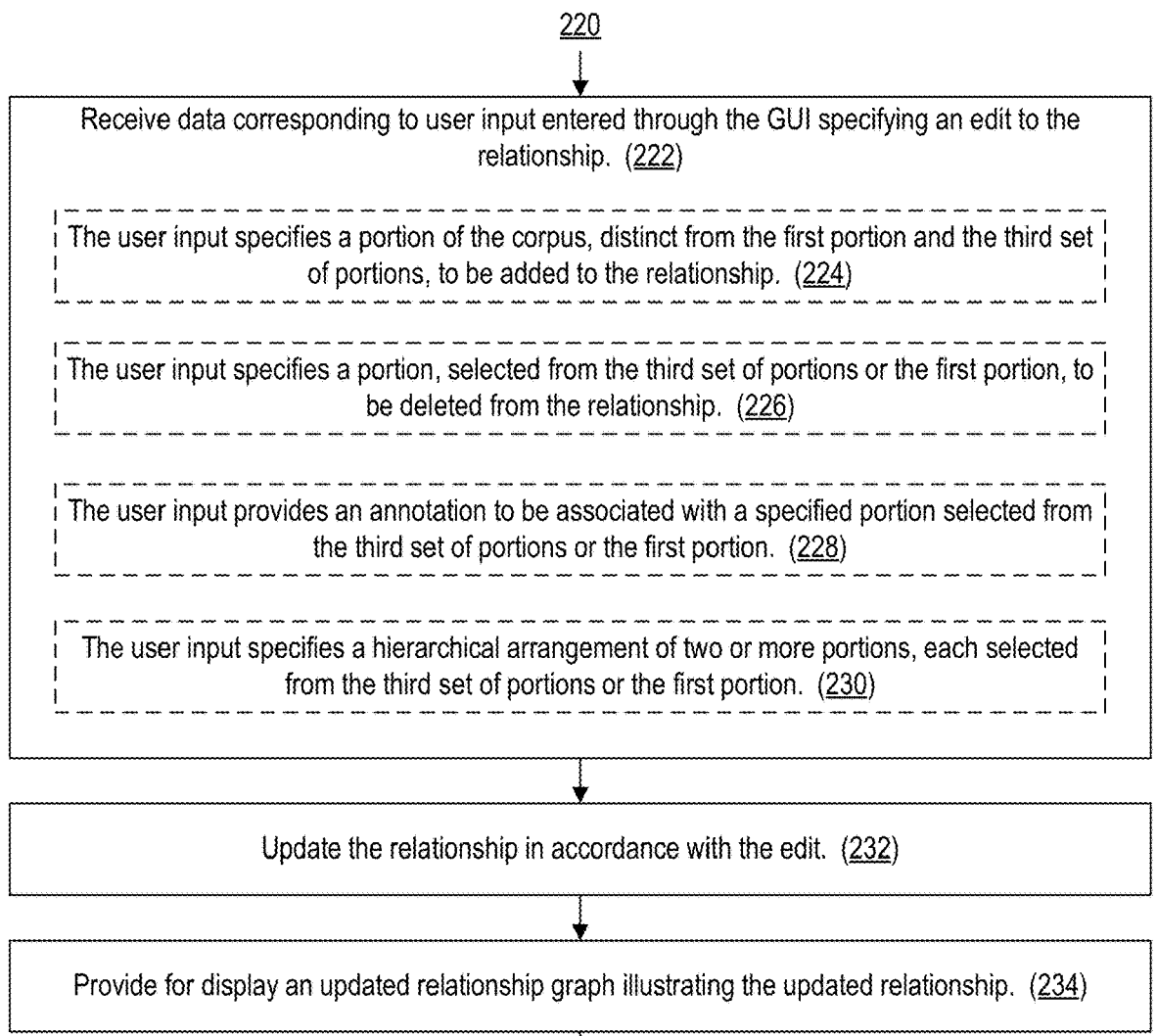

FIG. 2B is a flowchart showing a method 220 that may be performed as part of the method 200, by the same electronic device(s). After the relationship graph is provided (216) for display in a GUI that allows the user to edit the relationship, data corresponding to user input entered through the GUI is received (222). The data specifies an edit to the relationship. In response, the relationship is updated (232) in accordance with the edit. An updated relationship graph illustrating the updated relationship is provided (234) for display.

In some embodiments, the user input specifies (224) a portion of the corpus, distinct from the first portion and the third set of portions, to be added to the relationship. For example, the user selects an "Add" affordance 304 (FIG. 3A), enters a word (or term, document, etc.), and specifies a location on the relationship graph at which to add the word. Updating (232) the relationship includes adding the specified portion to the relationship. The updated relationship graph includes the specified portion (e.g., the specified portion is displayed in the relationship graph 302 in accordance with the user input).

Figure 3B:
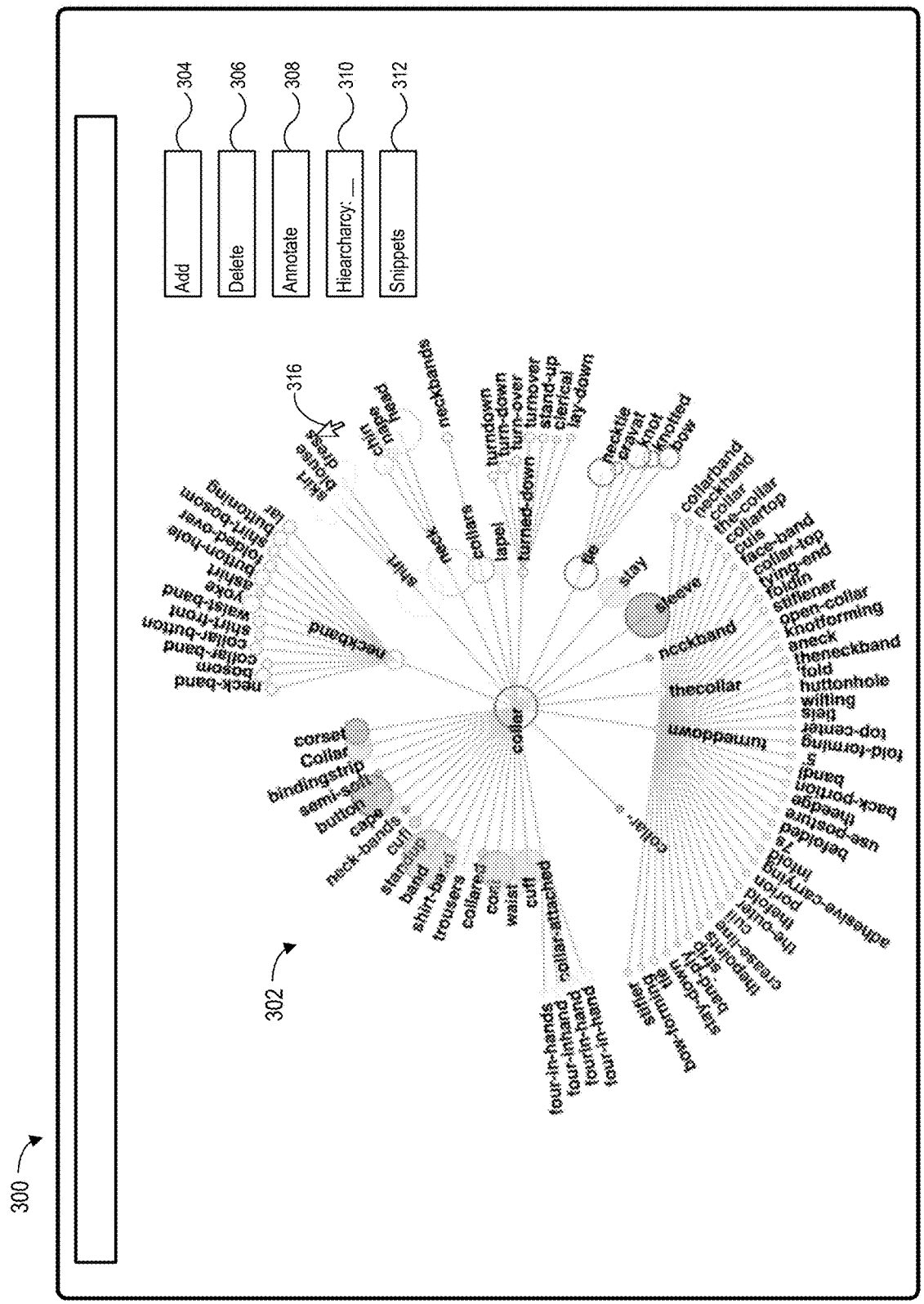

In some embodiments, the user input specifies (226) a portion, selected from the third set of portions or the first portion, to be deleted from the relationship. For example, the user selects a portion (e.g., the word "dress") using a cursor 316 (FIG. 3B) (e.g., by clicking on or highlighting "dress") and then selects the "Delete" affordance 306 (or vice versa). Updating (232) the relationship includes deleting the specified portion from the relationship. The updated relationship graph does not include the specified portion (e.g., "dress" and its link to "shirt" are removed from the relationship graph 302).

Figure 3C:
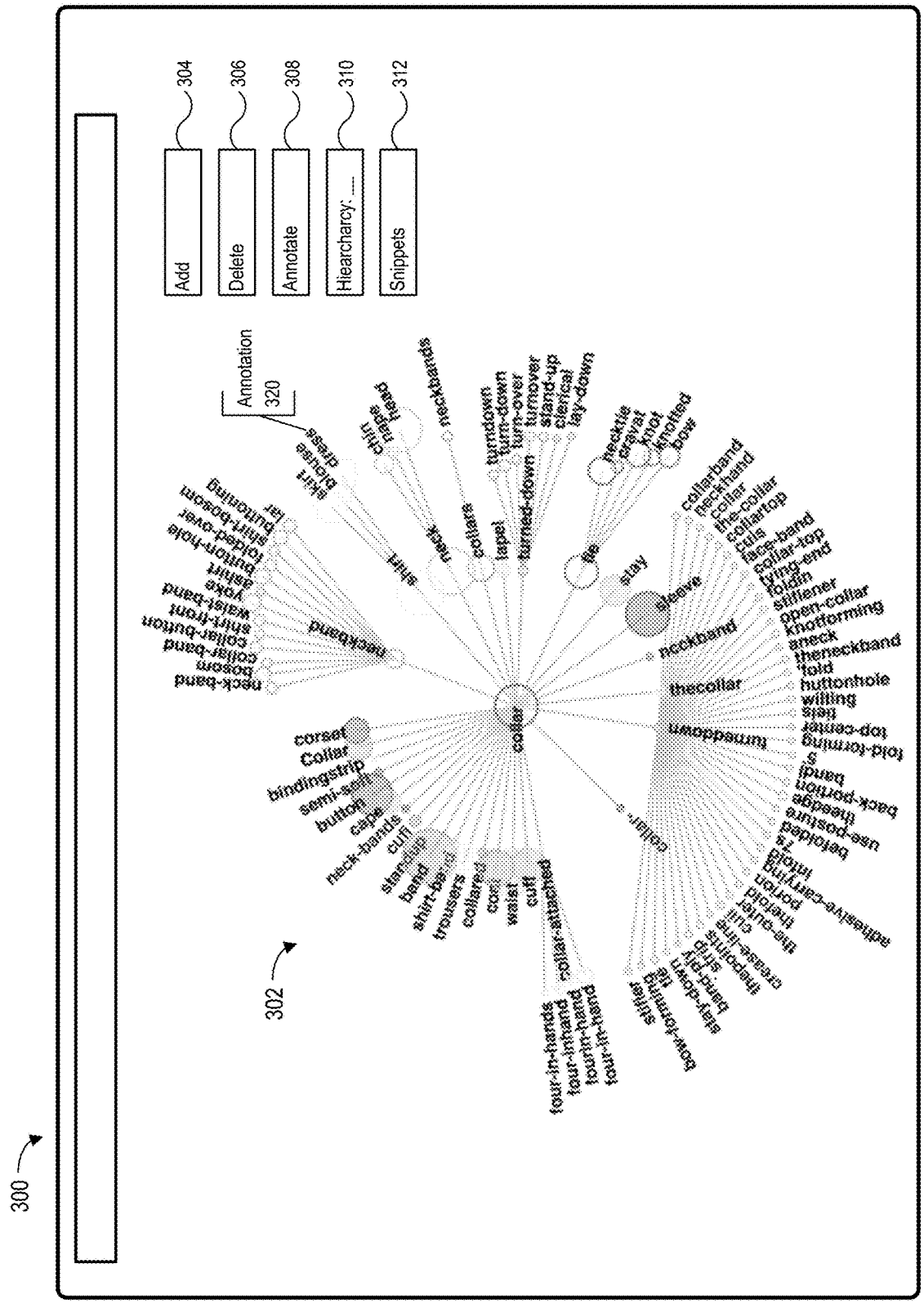

In some embodiments, the user input provides (228) an annotation to be associated with a specified portion selected from the third set of portions or the first portion. For example, the user selects a portion (e.g., the word "dress") using the cursor 316 (FIG. 3B), selects the "Annotate" affordance 308, and enters an annotation. Updating (232) the relationship includes associating the specified portion with the annotation. The updated relationship graph shows the annotation for the specified portion. For example, the relationship graph 302 is updated to include an annotation 320 (FIG. 3C).

In some embodiments, the user input specifies (230) a hierarchical arrangement of two or more portions, each selected from the third set of portions or the first portion. For example, the user selects a portion (e.g., the word "dress") using the cursor 316 (FIG. 3B), selects the "Hierarchy" affordance 310, and specifies a level within the hierarchy for the selected portion. Updating (232) the relationship includes storing the hierarchical arrangement in association with the relationship. The updated relationship graph shows the hierarchical arrangement (e.g., shows the levels assigned to respective terms). The hierarchical arrangement may be considered in subsequent uses of the relationship. For example, if the relationship as reflected in the relationship graph 302 is used as an ontology for subsequent searches, the hierarchical arrangement may be considered when ranking search results (e.g., determinations of the similarity between search terms and terms in the relationship, as used to rank search results, may be based at least in part on the hierarchical arrangement).

Figure 2C:
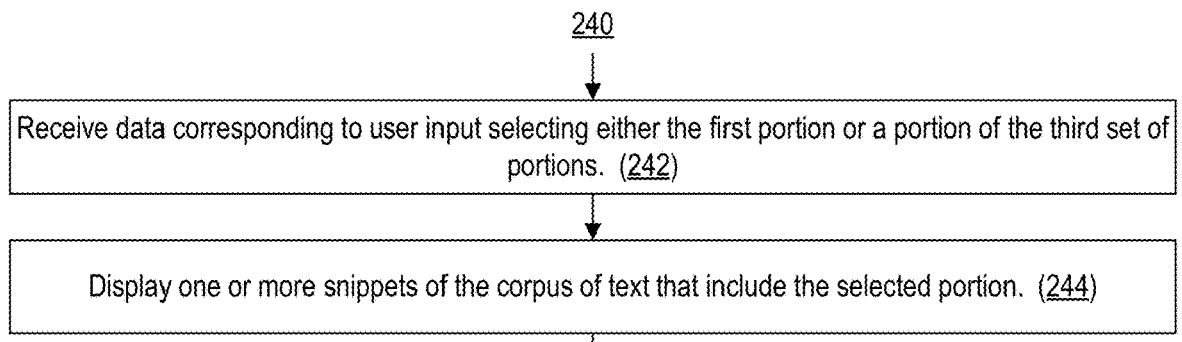
Figure 3D:
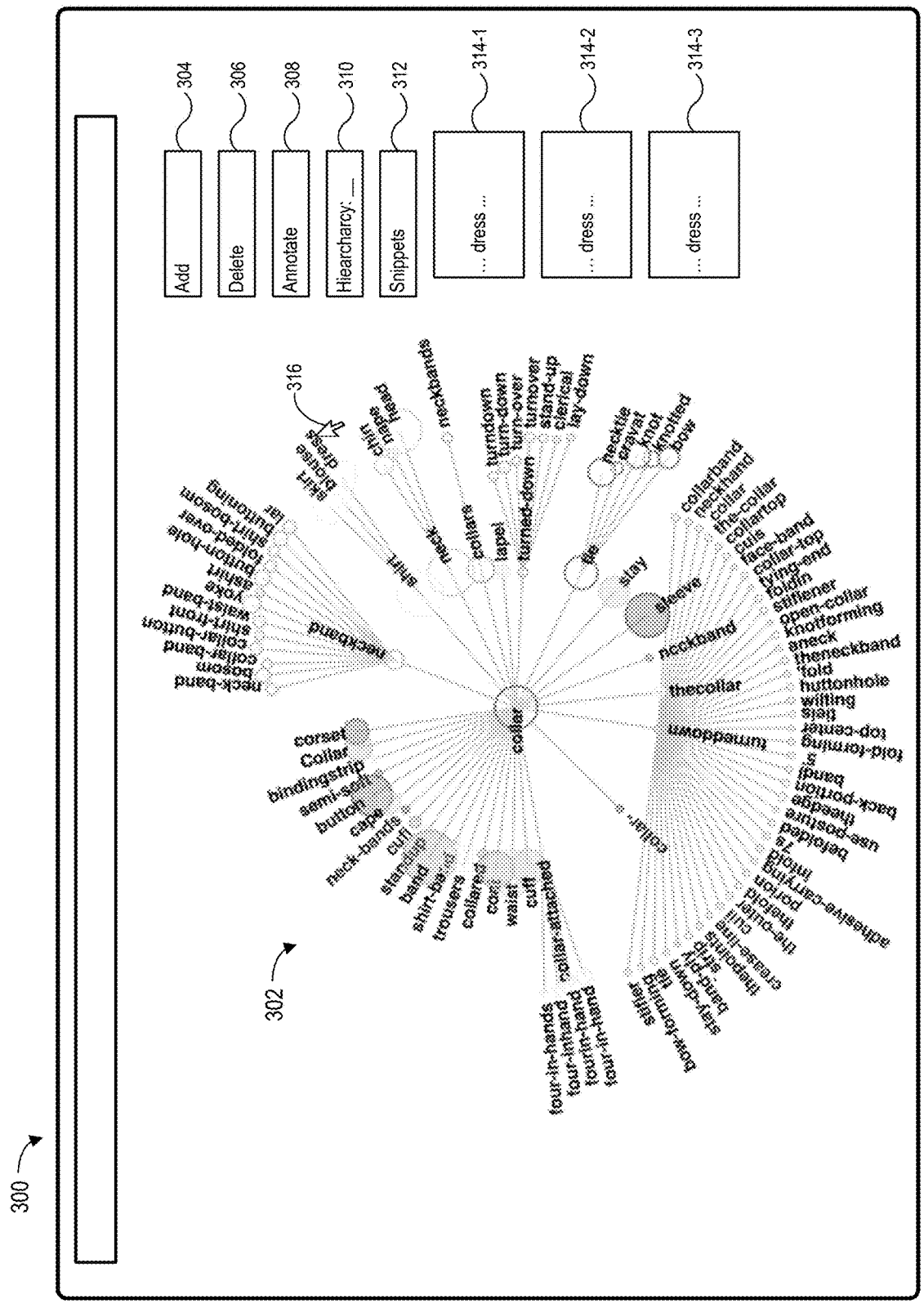
Figure 3E:
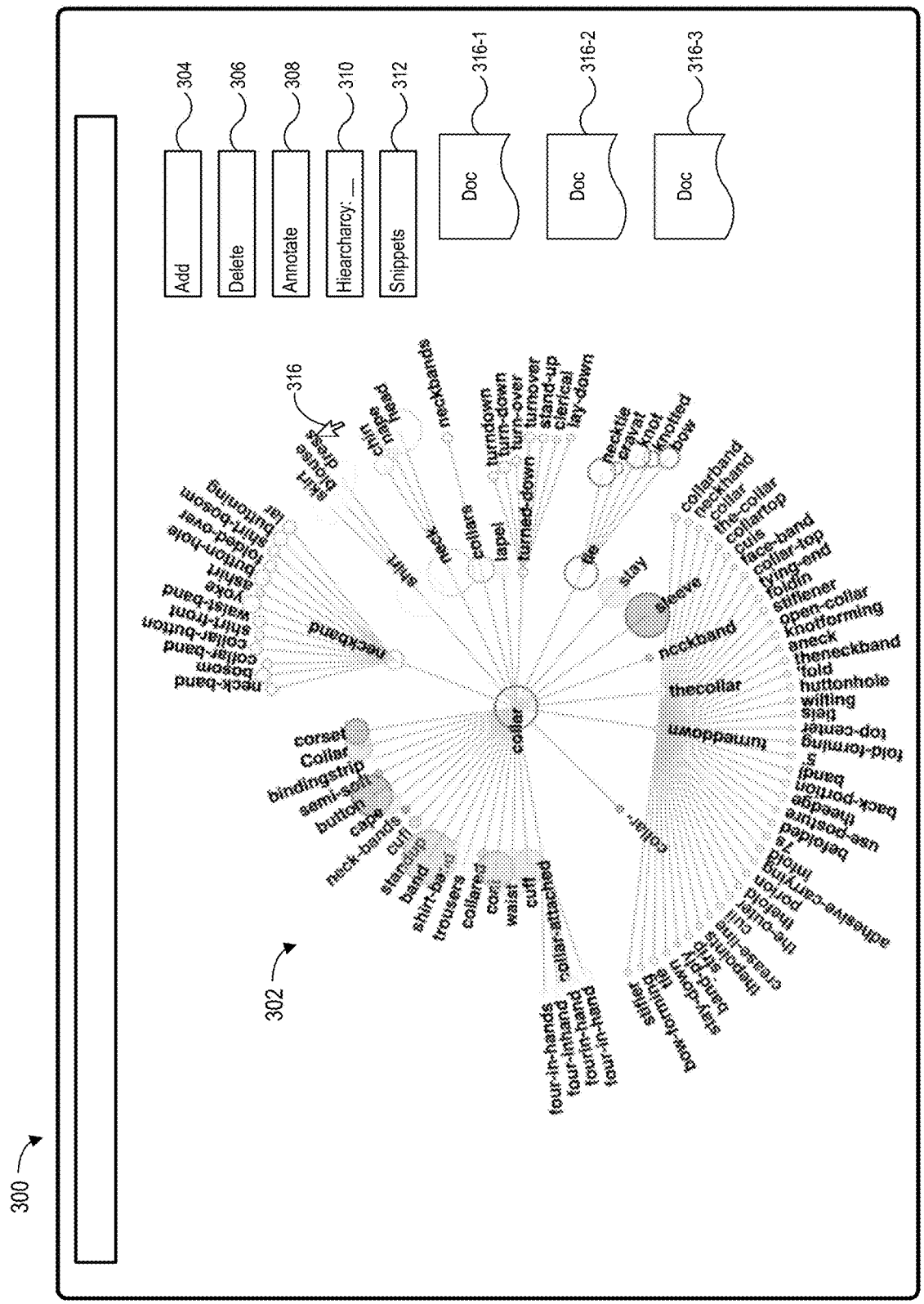

FIG. 2C is a flowchart showing a method 240 that may be performed as part of the method 200 or 220, by the same electronic device(s). After the relationship graph is provided (214, FIG. 2A; 234, FIG. 2B), data is received (242) corresponding to user input selecting either the first portion or a portion of the third set of portions. For example, the user selects a portion (e.g., the word "dress") using the cursor 316 (FIG. 3D or 3E) and then selects the "Snippets" affordance 312 (or vice versa). In response, one or more snippets of the corpus of text are displayed (244) that include the selected portion. In some embodiments, the snippets are sections of text 314-1 through 314-3 (FIG. 3D) from the corpus that include the selected portion. For example, the snippets may be sentences, paragraphs, or parts of paragraphs that include the selected portion. In some embodiments, the snippets are documents 316-1 through 316-3 (FIG. 3E) from the corpus that include the selected portion. The icons 316-1 through 316-3 representing these documents may be links to the documents. In some embodiments, the snippets are images, audio, or video that include or are associated with the selected portion. The method 240 thus provides an efficient way for searching within the corpus for a portion of the corpus from the third set of portions (e.g., for performing sentence and/or paragraph searching), allowing the user to quickly find and conveniently view desired sections of the corpus.

Figure 2D:
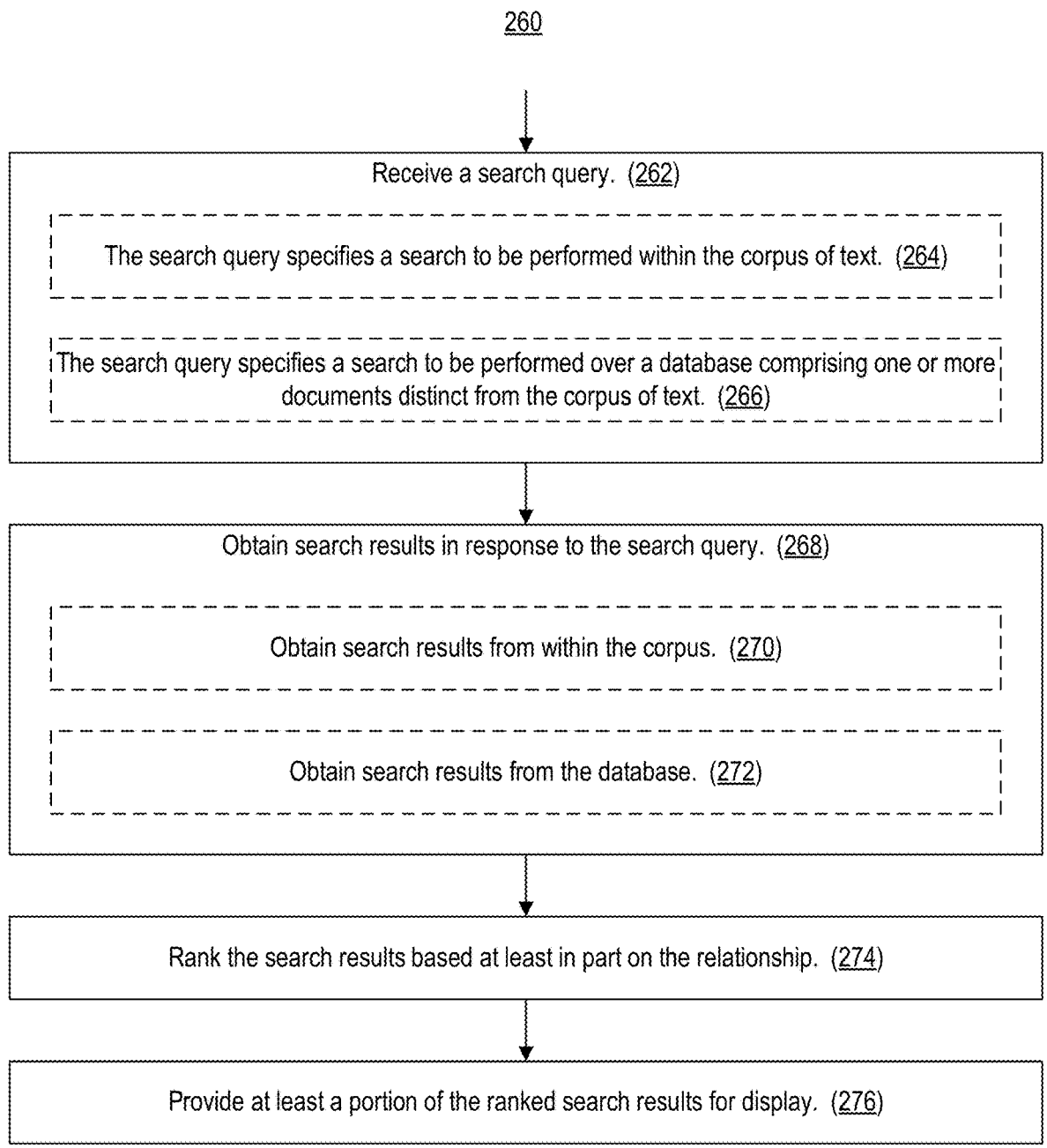
FIG. 2D is a flowchart showing a search method in accordance with some embodiments.

Searching based on the relationship defined in the methods 200, 220, and/or 240 is not limited to searches within the corpus of text, but instead may extend beyond the corpus or may be directed to documents that are not part of the corpus. For example, the relationship may be stored in a database and exported to enhance an external search engine. FIG. 2D is a flowchart showing a search method 260 that may be performed as part of the method 200, 220, or 240. The method 260 may be performed by the same electronic device(s) as the method 200, 220, or 240, or by a different device (e.g., a different server system). For example, the search method 260 may be performed after step 214/216 of the method 200, after step 234 of the method 220, or after step 244 of the method 240. Alternatively, the search method 260 may be performed after step 212 of the method 200 (e.g., such that the relationship graph is not provided for display).

In the method 260, a search query is received (262). Search results are obtained (268) in response to the search query. In some embodiments, the search query specifies (264) a search to be performed within the corpus of text and the search results are obtained (270) from within the corpus. In other embodiments, the search query specifies (266) a search to be performed over a database (e.g., the database 108, FIG. 1, or a portion thereof) that includes one or more documents distinct from the corpus of text and search results are obtained (272) from the database. The database may be entirely distinct from the corpus of text or may include documents in addition to the corpus of text. For example, the corpus of text may be a patent or patent application and the database may include patents and/or patent applications that may or may not include the corpus.

The search results are ranked (274) based at least in part on the relationship of step 212 (FIG. 2A). For example, the relationship may be used as an ontology that indicates degrees of similarity between search terms (e.g., any term in the relationship) and other terms (e.g., all other terms in the relationship). Search results can thus be ranked based at least in part on these degrees of similarity: the more similar the term(s) in a particular search result are to the search query or a portion thereof, the higher the search result's ranking. Use of the empirically based, contextually appropriate relationship of step 212 improves the accuracy of the search: highly relevant search results are promoted in the ranking and less relevant search results are demoted.

At least a portion of the ranked search results are provided (276) for display (e.g., are transmitted from the server system 106 to the client device 104 for display). For example, the search results may include snippets or documents from the corpus or database, which are listed in their ranked order.

In some embodiments, the method 260 is used to classify documents (e.g., patent applications). For example, the relationship of the step 212 may correspond to one or more classes in a classification scheme, and one or more searches are performed using terms from the document to be classified as search terms, with the searches producing classification recommendations.

Attention is now directed to other methods of analyzing text. In the method 200, portions of a corpus of text are identified based on an initial selected portion and similarity is determined based on proximities between numerical representations (e.g., vectors). In some situations, however, it may be desirable to extract terms from a corpus of text without starting from a selected term. Also, it may be desirable to rank extracted terms using multiple metrics, to help ensure identification of useful terms.

Figure 4:
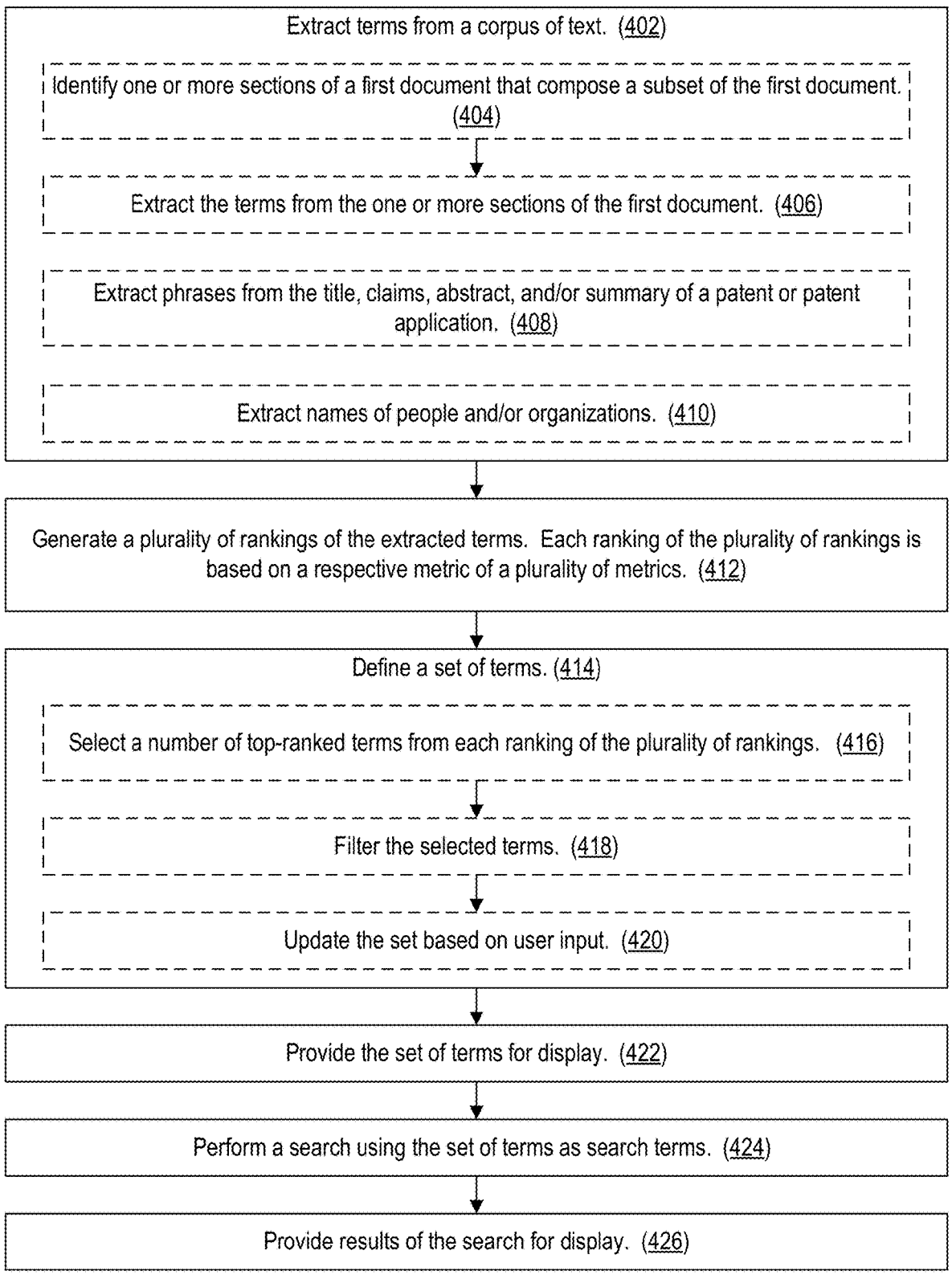
FIG. 4 is a flowchart showing a method of analyzing text using multiple metrics to rank terms, in accordance with some embodiments.

FIG. 4 is a flowchart showing a method 400 of analyzing text in accordance with some embodiments. The method 400 uses multiple metrics to rank terms and does not require (but may allow) selection or input of an initial term. The method 400 may be performed by the server system 106 (FIG. 1). Alternatively, the method 400 may be performed by a client device 104 (FIG. 1), or performance of the method 400 may be divided between the server system 106 and client device 104. The method 400 thus may be performed by one or more electronic systems 800 (FIG. 8), each of which may be an example of a server system 106 or client device 104. Steps in the method 400 may be combined or broken out.

In the method 400, terms are extracted (402) from a corpus of text. A term may be a single word or a combination of words that are related semantically, syntactically, and/or lexically. For example, a term may be a phrase (e.g., a noun phrase that includes a noun and one or more modifiers of the noun, such as adjectives and/or modifying phrases) (e.g., a verb phrase that includes the verb and one or more modifiers of the verb, such as adverbs and/or modifying phrases). A term thus may be a phrase that includes another phrase (e.g., a noun phrase that includes a phrase that modifies the noun)

in accordance with some embodiments. Words in a term may be adjacent within the corpus of text but are not necessarily adjacent. The corpus of text may include one or more documents. For example, the corpus may be a book, an article, or a collection of books and/or articles. In another example, the corpus may be a patent, a patent application, or a collection of patents and/or patent application. In yet another example, the corpus may include a collection of patent assignment records. In still another example, the corpus may include respective descriptions of images, videos, and/or audio files. Many other examples are possible.

In some embodiments, the corpus includes (e.g., is limited to) a first document and extracting terms from the corpus includes identifying (404) one or more sections of a first document that compose a subset of the first document. For example, the one or more sections may summarize the first document (e.g., may include a title, introduction, and/or conclusion). The extracted terms are extracted (406) from the one or more sections of the first document. Limits may be set on the numbers of terms extracted from respective sections of the one or more sections. For example, terms within a respective section may be ranked (e.g., based on term frequency, and thus number of occurrences, within the section or the one or more sections) and a specified (or maximum) number of top-ranked terms within the respective section may be extracted. If the one or more sections includes multiple sections, the specified or maximum number of terms may be the same or different for each section of the multiple sections.

If the first document is a patent or patent application, the one or more sections may include the title, claims, abstract, and/or summary. Extracting the terms may include extracting (408) phrases from the title, claims, abstract, and/or summary. For example, phrases (e.g., all phrases) are extracted from the title; a top first number of phrases from the claims (e.g., as ranked by term frequency within the title, claims, abstract, and/or summary) are extracted; and a top second number of phrases from the abstract (e.g., as ranked by frequency within the title, claims, abstract, and/or summary) are extracted. A top third number of phrases from the summary (e.g., as ranked by term frequency within the title, claims, abstract, and/or summary) may be extracted. The phrases may be noun phrases and/or verb phrases. The first, second, and/or third numbers may be different from or equal to each other.

In some embodiments, extracting the terms from the corpus includes extracting (410) the names of people and/or organizations (e.g., the names of corporations, partnerships, and/or other business entities). For example, if the corpus includes assignment records for patents and/or patent applications, the terms may include names of assignees. In some embodiments, extracting the terms from the corpus includes extracting the names of any entity, such as entities selected from the group consisting of persons, organizations, events, publications, websites, addresses, locations, dates, timestamps, and technical terms specific to an industry (e.g., biological names, chemical formulae, product names and types, etc.). The extracted names may be used for entity normalization. For example, variants of respective names are identified and corrected for consistency. In another example, entities are identified that are similar to a given entity (e.g., in terms of patent title, classification, year, etc.).

A plurality of rankings of the extracted terms is generated (412). In some embodiments, each ranking of the plurality of rankings is based on a respective metric of a plurality of metrics, such that each ranking is based on a single metric instead of a combination of metrics.

In some embodiments, numerical representations (e.g., vectors) for the extracted terms are generated based on the plurality of metrics, by calculating values for the metrics for each of the extracted terms. For example, each metric may correspond to a respective axis of a vector. A neural network is trained to generate the plurality of rankings of the extracted terms, or more generally to select terms for the set of terms. Term selection (e.g., per steps 414 and 416, below) thus is performed by providing the numerical representations to the neural network and obtaining the output of the neural network, in accordance with some embodiments. Generating (412) the plurality of rankings of the extracted terms therefore may include providing the numerical representations for the extracted terms to the neural network, or the neural network may be used as an alternative to generating the rankings. These numerical representations may include independently generated numerical representations of the terms (e.g., word or document vectors).

A set of terms is defined (414). Defining the set of terms includes selecting (416) a number of top-ranked terms from each ranking of the plurality of rankings. A term thus may be selected if it highly ranked using one of the metrics, even if it is ranked low using the other metrics.

Examples of metrics that may be used for the rankings include, without limitation, term frequency in the corpus (ranked low to high) or in a document in the corpus (ranked high to low); document frequency for a plurality of documents in the corpus (ranked low to high); joint probability of words in a term (ranked low to high); minimum pairwise similarity of words in a term (ranked low to high); one or more metrics based on semantic, syntactic, or lexical properties; and a similarity metric with respect to a specified term (ranked high to low). The specified term may have been provided (e.g., through user input) earlier in the method 400. Examples of similarity metrics with respect to a specified term include, without limitation, an edit distance from the specified term (e.g., the number of discrete edits required to change the specified term into a respective term) and a similarity metric based on a proximity of a numerical representation (e.g., vector) of a respective term to a numerical representation of the specified term. In some embodiments, multiple similarity metrics with respect to the specified term are used for respective rankings. For example (e.g., when the terms are names of people, organizations, and/or other entities), a first metric is edit distance from the specified term and a second metric is a similarity metric based on numerical-representation proximity.

In some embodiments, defining the set of terms further includes filtering (418) the selected terms. For example, terms that intersect the top-ranked terms from respective rankings of the plurality of rankings are taken for the set of terms and other terms are excluded. A term thus may be kept in the set if it is found in the top-ranked terms for a specified number (i.e., two or more) (e.g., all) of the plurality of rankings, and otherwise excluded.

Figure 5:
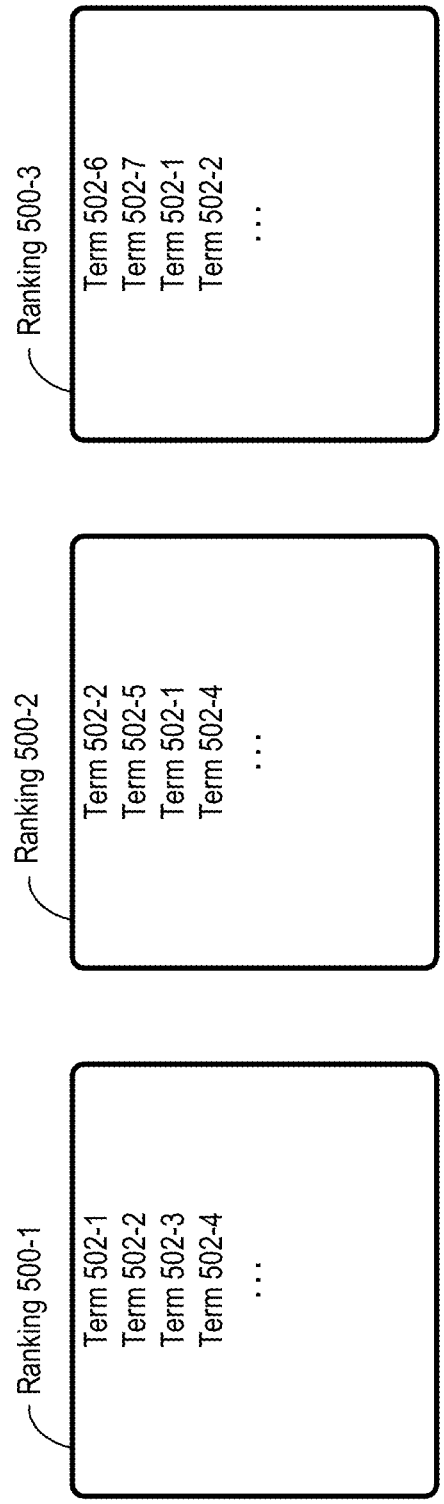
FIG. 5 shows term rankings of extracted terms, with each ranking based on a different metric, in accordance with some embodiments.

FIG. 5 shows an example of three rankings 500 of extracted terms 502, each based on a different metric. A first ranking 500-1 has top-four terms 502-1, 502-2, 502-3, and 502-4, in that order. A second ranking 500-2 has top-four terms 502-2, 502-5, 502-1, and 502-4, in that order. A third ranking 500-3 has top-four terms 502-6, 502-7, 502-1, and 502-2, in that order. If term extraction is limited to the top four terms from each ranking 500, and no filtering based on intersections between rankings is performed, then all of the terms 502-1 through 502-7 are included in the set of terms (assuming they aren't otherwise deleted). If filtering based on intersections between rankings is performed, such that terms must be top-ranked in all three of the rankings 500, then terms 502-1 and 502-2 are included in the set of terms (assuming they aren't otherwise deleted) and the other terms are omitted. If filtering based on intersections between rankings is performed, such that terms must be top-ranked in at least two of the rankings 500, then terms 502-1, 502-2, and 502-4 are included in the set of terms (assuming they aren't otherwise deleted) and the other terms are omitted.

Another example of filtering (418) the selected terms includes omitting from the set of terms any single words having a document frequency, for an ensemble of documents that includes the corpus, that satisfies (e.g., exceeds, or equals or exceeds) a threshold. Such words are unlikely to be useful to a searcher or classifier. The ensemble may be the corpus or may include other text (e.g., other documents) in addition to the corpus.

Still another example of filtering (418) the selected terms includes clustering selected terms to identify similar terms in the set and omitting from the set a first term having a similarity to a second term in the set that satisfies (e.g., exceeds, or equals or exceeds) a threshold. The similarity is determined in accordance with the clustering (e.g., based on the proximity of numerical representations of the terms such as vectors, with closer being more similar). Such a filter may eliminate a term that is so close to another term as to be effectively redundant.

Many other examples of filtering (418) the selected terms are possible.

In some embodiments, defining the set of terms further includes updating (420) the set based on user input. For example, the set of terms is provided (e.g., sent from the server system 106 to the client device 104, FIG. 1) for display in a GUI that allows the user to provide input (e.g., in the GUI 600, FIG. 6, which lists selected terms 602). Data corresponding to user input is received (e.g., is received at the server system 106 from the client device 104) and the set of terms is updated based on the user input. If the user input selects a term in the set for deletion (e.g., using "Delete" affordance 306, FIG. 6), the selected term is deleted from the set. If the user input specifies a term to be added to the set (e.g., using "Add" affordance 304, FIG. 6, and a resulting input field), the specified term is added to the set. If the user input provides an annotation for a term in the set (e.g., using "Annotate" affordance 308, FIG. 6), the annotation is stored in association with the term (e.g., by analogy to annotation 320, FIG. 3C). If the user input specifies a hierarchical arrangement for respective terms in the set (e.g., using "Hierarchy" affordance 310, FIG. 6), the hierarchical arrangement is stored in association with the respective terms.

In one example, a relationship graph (e.g., relationship graph 302, FIG. 3A) is provided for display. The relationship graph displays a relationship between terms that was determined independently of the method 400 (e.g., that was determined in the method 200, FIG. 2A). Data corresponding to user input selecting a term from the relationship graph is received (e.g., is received at the server system 106 from the client device 104). In response, the selected term is added to the set of terms.

Figure 6:
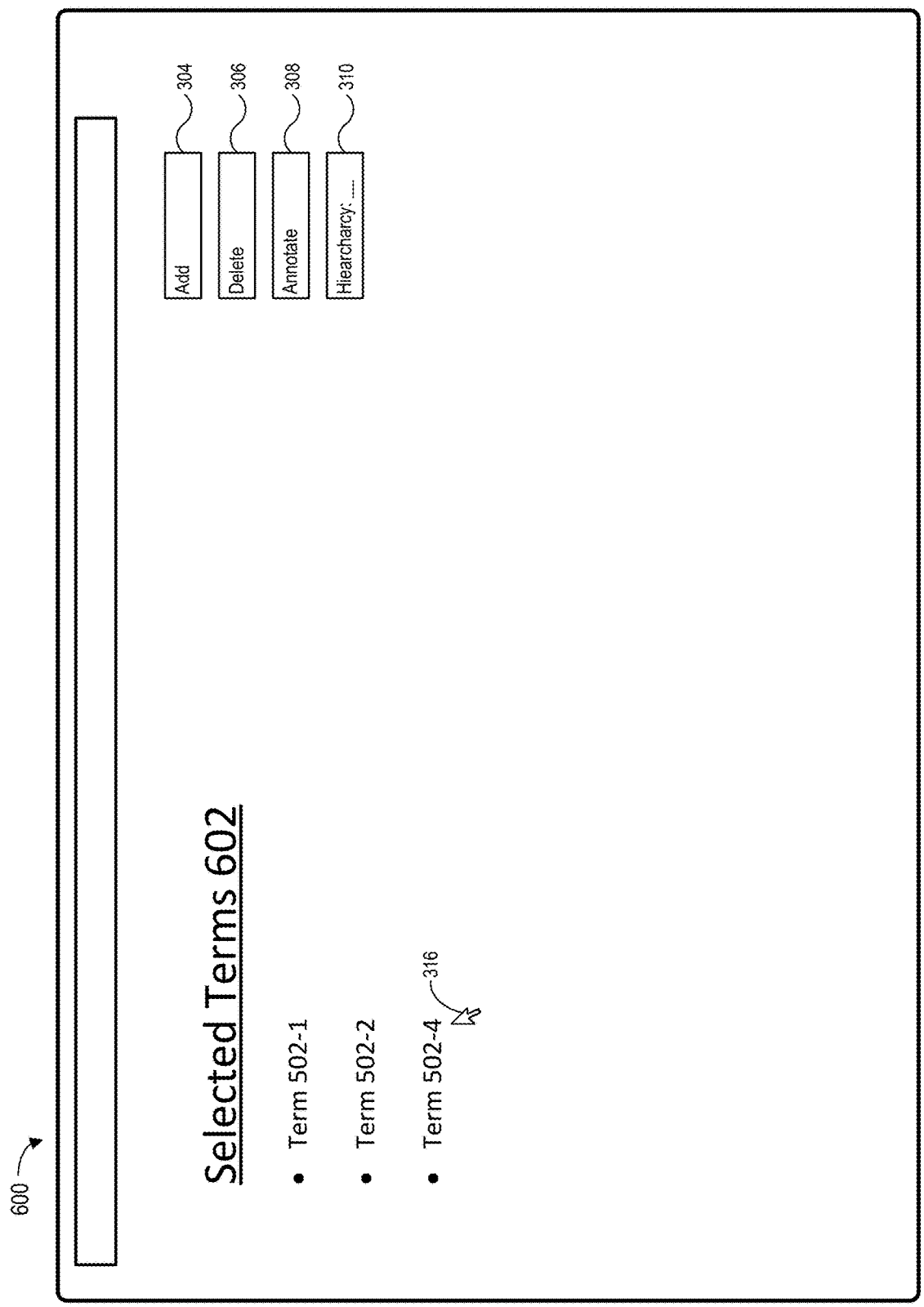
FIG. 6 shows a graphical user interface for viewing and editing a set of terms in accordance with some embodiments.

Once the set of terms has been defined, it may be provided (422) for display. For example, the server system 106 transmits the set of terms to the client device 104 for display. The set of terms may be displayed in a GUI such as the GUI 600 (FIG. 6). Alternatively, or in addition, the set of terms may auto-populate a search query input field (e.g., search box 701, FIG. 7, which is populated with search terms 702) for use in a subsequent search (e.g., the search of step 424, below). The terms may be provided for display within their context (e.g., within snippets). In some embodiments, step 422 is omitted (e.g., the method 400 proceeds from step 420 directly to step 424).

In some embodiments, the set of terms is used to tag the corpus or respective documents within the corpus. For example, if the corpus is a patent or patent application, the patent or patent application is tagged with the set of terms, such that the set of terms is stored in association with the patent or patent application. These tags may be used for subsequent operations (e.g., searching, classification, and/or clustering).

In some embodiments, a search is performed (424) using the set of terms as search terms. Results of the search are provided (426) for display (e.g., are transmitted from the server system 106 to the client device 104, FIG. 1). The set of terms may be used to search for one or more documents distinct from the corpus of text; a listing of at least a subset of the one or more documents is provided for display. For example, if the corpus is a patent or patent application, a search is performed to search for other relevant patents and/or patent applications. Alternatively, or in addition, the set of terms may be used to search for text within the corpus and text identified by the search within the corpus is provided for display (e.g., snippets of the corpus are provided for display).

Figure 7:
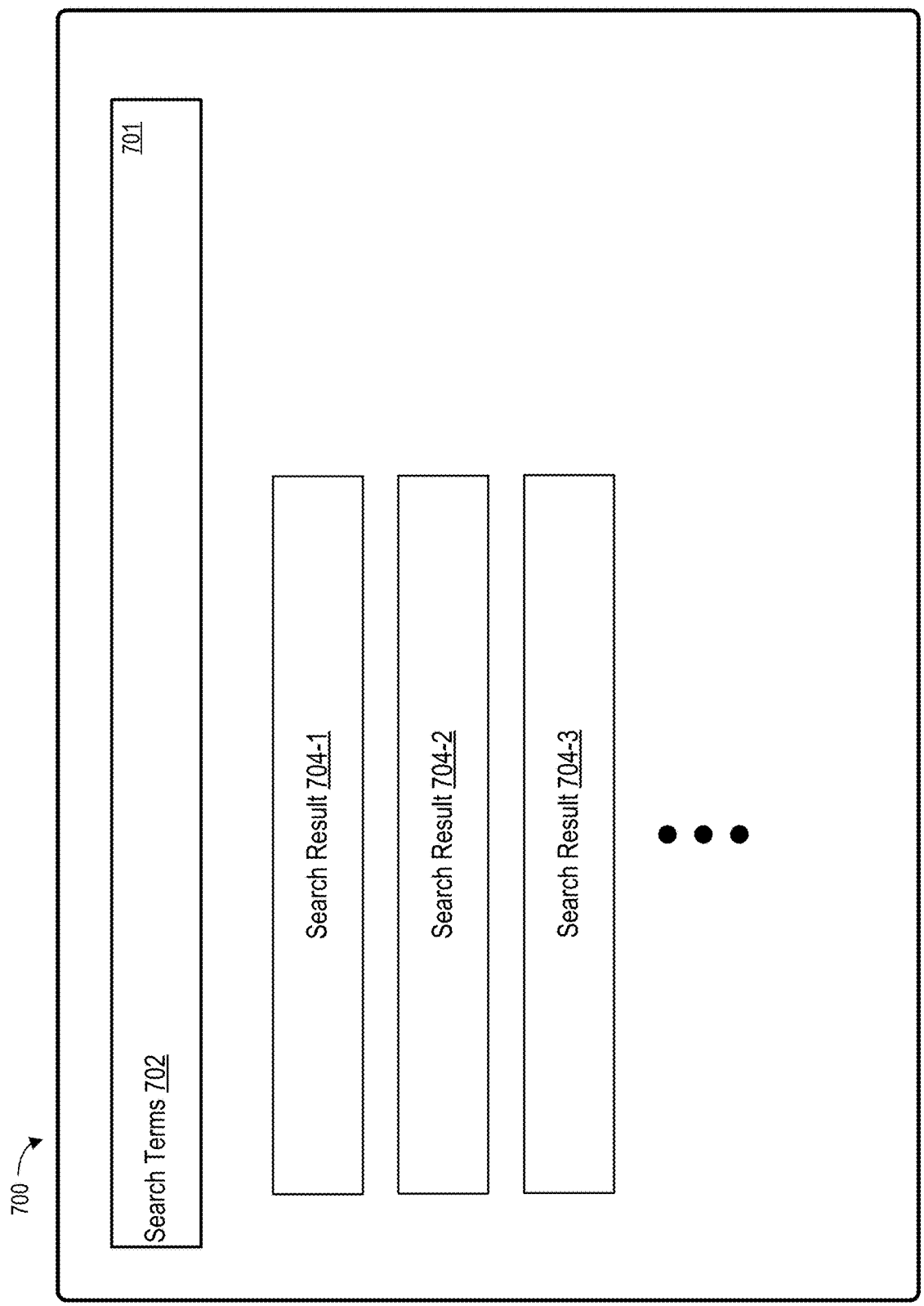
FIG. 7 shows a graphical user interface with search results in accordance with some embodiments.

FIG. 7 shows a GUI 700 with search results 704-1, 704-2, and 704-3 as provided in step 426 in accordance with some embodiments. The search results 704 may be snippets (e.g., sentences, paragraphs, parts of paragraphs, etc.) (e.g., images, audio, and/or video associated with text). If the snippets are from the same document, they may include links to respective parts of the document in which they are found. If the snippets are from multiple documents, they may include links to their respective documents. In some embodiments, instead of snippets, the search results 704 are documents. Many other examples of GUIs for listing the search results are possible.

The method 400 provides an effective way for a user to explore the content of an electronic corpus of text. The method 400 may also provide an efficient way to search for content inside and/or outside of the corpus, by intelligently providing search terms and summary terms. For example, use of the method 400 may reduce the number of iterations involved in a search.

Figure 8:
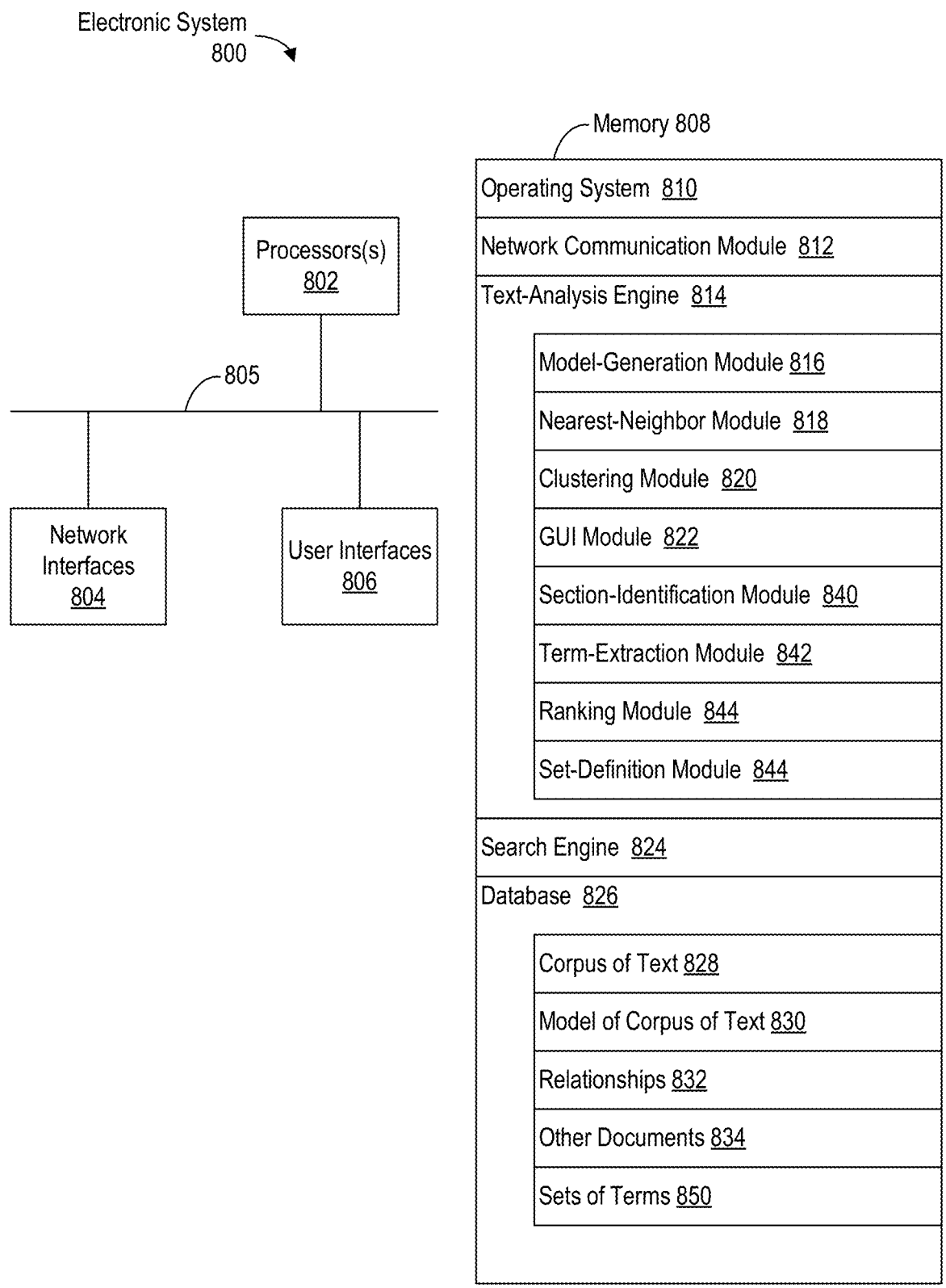
FIG. 8 is a block diagram of an electronic system that analyzes text in accordance with some embodiments.

FIG. 8 is a block diagram of an electronic system 800 in accordance with some embodiments. The electronic system 800 may be an example of the server system 106 or a client device 104 (FIG. 1). The server system 800 typically includes one or more processors 802 (e.g., CPUs and/or GPUs), one or more network interfaces 804 (wired and/or wireless), memory 808, and one or more communication buses 805 interconnecting these components. The server system 800 may include one or more user interfaces 806 (e.g., a display screen, which may be a touch screen; a keyboard; a mouse; a microphone; etc.).

Memory 808 includes volatile and/or non-volatile memory. Memory 808 (e.g., the non-volatile memory within memory 808) includes a non-transitory computer-readable storage medium. Memory 808 optionally includes one or more storage devices remotely located from the processors 802 and/or a non-transitory computer-readable storage medium that is removably inserted into the server system 800. In some embodiments, memory 808 (e.g., the non-transitory computer-readable storage medium of memory 808) stores the following modules and data, or a subset or superset thereof:

an operating system 810 that includes procedures for handling various basic system services and for performing hardware-dependent tasks;

a network communication module 812 that is used for connecting to other computing devices via the one or more network interfaces 804 and the one or more networks 102 (FIG. 1);

a text-analysis engine 814;

a search engine 824; and a database 826 (e.g., the database 108, FIG. 1, or a database including information retrieved from the database 108), including a corpus of text 828, a model of the corpus of text 830, one or more relationships 832 (e.g., as generated by the clustering module 820), other documents 834 distinct from the corpus of text 828, and/or sets of terms 850.

The text-analysis engine 814 may include a model-generation module 816, a nearest-neighbor identification module 818 for identifying nearest-neighbor portions in a model generated by the model-generation module 816, and/or a clustering module 820 for clustering nearest-neighbor portions identified by the nearest-neighbor identification module 818. The text-analysis engine 814 may also (or alternatively) include a section-identification module 840 for identifying sections of a corpus of text, a term-extraction module 842 for extracting terms from the corpus of text (e.g., from the identified sections), a ranking module 844 for ranking extracted terms based on multiple metrics, and/or a set-definition module 846 for defining a set of terms based on the rankings. The text-analysis engine 814 may further include a GUI module 822 (e.g., for providing the GUI 300, FIGS. 3A-3E; the GUI 600, FIG. 6; and/or the GUI 700, FIG. 7).

In some embodiments, the memory 808 (e.g., the non-transitory computer-readable storage medium of the memory 808) includes instructions for performing all or a portion of the methods 200, 220, 240, and/or 260 (FIGS. 2A-2D). Additionally, or alternatively, the memory 808 (e.g., the non-transitory computer-readable storage medium of the memory 808) includes instructions for performing all or a portion of the method 400 (FIG. 4).

Each of the modules stored in the memory 808 corresponds to a set of instructions for performing one or more functions described herein. Separate modules need not be implemented as separate software programs. The modules and various subsets of the modules may be combined or otherwise re-arranged. In some embodiments, the memory 808 stores a subset or superset of the modules and/or data structures identified above.

FIG. 8 is intended more as a functional description of the various features that may be present in an electronic system than as a structural schematic. In practice, items shown separately could be combined and some items could be separated. Furthermore, the functionality of the electronic system 800 may be split between multiple devices (e.g., between multiple server computers, if the electronic system 800 is a server system).

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method of analyzing text, comprising,
    at an electronic system comprising one or more processors and memory storing instructions for execution by the one or more processors:
    extracting terms from a corpus of text;
    generating a plurality of rankings of the extracted terms, wherein each ranking of the plurality of rankings is based on a respective metric of a plurality of metrics;
    defining a set of terms, comprising selecting a number of top-ranked terms from each ranking of the plurality of rankings; and
    providing the set of terms for display.

2. The method of claim 1, wherein defining the set of terms further comprises, at the electronic system, taking the intersection of the top-ranked terms from respective rankings of the plurality of rankings.

3. The method of claim 1, further comprising, at the electronic system:
    performing a search using the set of terms as search terms; and
    providing results of the search for display.

4. The method of claim 3, wherein:
    performing the search comprises using the set of terms as search terms to search for one or more documents distinct from the corpus of text; and
    providing the results comprises providing a listing of at least a subset of the one or more documents for display.

5. The method of claim 3, wherein:
    performing the search comprises using the set of terms as search terms to search for text within the corpus; and
    providing the results comprises providing text within the corpus identified by the search.

6. The method of claim 1, wherein:
    the corpus is a first document;
    the method further comprises, at the electronic system, identifying one or more sections of the first document, the one or more sections composing a subset of the first document; and
    the extracting comprises extracting the terms from the one or more sections of the first document.

7. The method of claim 6, wherein:
    the first document comprises a patent or patent application; and
    the one or more sections comprise the claims of the patent or patent application.

8. The method of claim 7, wherein the one or more sections further comprise the title and the abstract of the patent or patent application.

9. The method of claim 8, wherein extracting the terms comprises:
    extracting phrases from the title;
    extracting a top first number of phrases from the claims, as ranked by frequency within the title, claims, and abstract; and
    extracting a top second number of phrases from the abstract, as ranked by frequency within the title, claims, and abstract.

10. The method of claim 1, wherein the terms include names of persons or organizations.

11. The method of claim 1, wherein each metric of the plurality of metrics is selected from the group consisting of:
    term frequency in the corpus or in a document in the corpus;

document frequency for a plurality of documents in the corpus;
joint probability of words in a term;
minimum pairwise similarity of words in a term;
one or more metrics based on semantic, syntactic, or lexical properties; and
a similarity metric with respect to a specified term.

12. The method of claim 1, wherein a first metric of the plurality of metrics is edit distance from a specified term.

13. The method of claim 12, wherein a second metric of the plurality of metrics is a similarity metric based on a proximity of a numerical representation of a respective term to a numerical representation of the specified term.

14. The method of claim 1, wherein defining the set of terms further comprises, at the electronic system, omitting from the set any single words having a document frequency, for an ensemble of documents that includes the corpus, that satisfies a threshold.

15. The method of claim 1, wherein defining the set of terms further comprises, at the electronic system, clustering selected terms to identify similar terms in the set.

16. The method of claim 15, wherein defining the set of terms further comprises, at the electronic system, omitting from the set a first term having a similarity to a second term in the set that satisfies a threshold, the similarity being determined in accordance with the clustering.

17. The method of claim 1, wherein defining the set of terms further comprises, at the electronic system:
providing the set of terms for display; and
editing the set of terms in response to user input.

18. The method of claim 1, wherein defining the set of terms further comprises, at the electronic system:
providing for display a relationship graph displaying a relationship between terms, the relationship having been determined independently of the extracting and generating; and
in response to user input selecting a term from the relationship graph, adding the selected term to the set of terms.

19. The method of claim 1, further comprising, at the electronic system:
training a neural network to select terms for the set of terms;
generating numerical representations for the extracted terms based on the plurality of metrics; and
providing the numerical representations to the neural network;
wherein the selecting comprises obtaining output of the neural network.

20. A non-transitory computer-readable storage medium storing one or more programs for execution by an electronic system, the one or more programs including instructions for:
extracting terms from a corpus of text;
generating a plurality of rankings of the extracted terms, wherein each ranking of the plurality of rankings is based on a respective metric of a plurality of metrics;
defining a set of terms, comprising selecting a number of top-ranked terms from each ranking of the plurality of rankings; and
providing the set of terms for display.

* * * * *